United States Patent [19]

Bardin et al.

[11] 4,201,276
[45] May 6, 1980

[54] VORTEX-TYPE OIL MIST GENERATOR

[76] Inventors: Viktor P. Bardin, ulitsa Oktyabrskaya 17/3, kv. 43, Kolpino Leningradskoi oblasti; Evgeny A. Petrov, ulitsa Bela Kuna, 27, korpus 1, kv. 53, Leningrad; Viktor M. Rudelson, pereulok Makarenko, 3, kv. 32, Leningrad; Jury L. Sternik, Zanevsky prospekt, 43, kv. 170, Leningrad, all of U.S.S.R.

[21] Appl. No.: 956,891

[22] Filed: Nov. 2, 1978

[51] Int. Cl.² ............................................. F16N 7/34
[52] U.S. Cl. .............................. 184/55 A; 252/359 A
[58] Field of Search ............... 184/6.26, 55 A, 50 R, 184/50 A; 252/359 A

[56] References Cited
U.S. PATENT DOCUMENTS

| | | | |
|---|---|---|---|
| 2,698,065 | 12/1954 | Streicker et al. | 184/55 A |
| 3,515,676 | 6/1970 | Hierta et al. | 252/359 A |
| 3,605,942 | 9/1971 | Lyth | 184/55 A X |

*Primary Examiner*—David H. Brown
*Attorney, Agent, or Firm*—Holman & Stern

[57] ABSTRACT

A vortex-type oil mist generator comprises two nozzles, each having tangential gas delivery channels to create a rotating flow of gas, an oil delivery duct supplying the oil into the rotating flow of gas, whereby a rotating flow of mist is created, and an oil mist outlet. In said generator, the nozzles are mutually arranged so that their oil mist outlets face each other, while the tangential gas delivery channels of the nozzles are arranged so as to ensure the rotation of the oil mist flow exiting from the outlet of the first nozzle in the direction opposite to the direction of rotation of the oil mist flow exiting from the outlet of the second nozzle.

Such a mutual arrangement of the nozzles as well as their design makes it possible to generate a high density mist having an increased degree of dispersity.

3 Claims, 9 Drawing Figures

VORTEX-TYPE OIL MIST GENERATOR

FIELD OF THE INVENTION

The present invention relates to apparatus for generating a lubricant particle suspension in a gaseous carrier, and more particularly to oil mist generators operating on a vortex principle.

The invention can most advantageously be used in association with metallurgy and machinery for the purpose of lubricating bearing units, gear or link transmissions when the latter are disposed at a large distance from the oil mist generator and when required to aerosolize liquid lubricant into finely divided particles.

BACKGROUND OF THE INVENTION

The present oil mist generators operating on a vortex principle enjoy a best combination of properties as compared to the known types of oil mist generators, namely, to the generators provided with a throat of a venturi. This results from the fact that a vortex-type oil mist generator enables a rotating flow of gas to be accelerated to high velocity and provides an increased magnitude of the differential in pressure across the oil delivery duct supplying the oil into the rotating flow of gas.

A vortex-type oil mist generator known to the prior art (cf., e.g., U.S. Pat. No. 3,515,676, U.S. Cl. 252-359) comprises a nozzle and an oil storage chamber provided with a baffle member located therein and arranged above the oil level. The nozzle is defined by a chamber having tangential gas delivery channels designed to create a rotating flow of gas, by an intermediate chamber suitable for supplying the oil into the rotating flow of gas, and by an oil mist outlet. The intermediate chamber has tangentially arranged inlet openings which are in communication with the oil storage chamber and are adapted for supplying the oil into the rotating flow of gas. In the oil storage chamber, the baffle member is located in the path of movement of the rotating flow of oil mist and serves to control the degree of oil mist dispersity.

When passing through the tangential gas delivery channels, the pressurized gas is caused to be swirled. The rotating flow of gas formed thereby creates, as it flows through the intermediate chamber, a suction area therein, which suction area causes an aspiration of the oil passing through the tangentially arranged openings of the intermediate chamber into the rotating flow of gas where it is then particalized, thus generating a rotating flow of oil mist. The generated oil mist as it leaves the nozzle outlet has a variable range of particle size. The baffle member tends to coalesce large-size oil particles and return them to the oil storage chamber, while large amounts of small-sized oil particles are useable to be directed to the machinery parts requiring lubrication.

However, the large-sized particles of the oil condensed on the baffle member form an oil film which has a tendency to draw a certain amount of small-sized particles thereinto, thus decreasing the oil mist density.

Furthermore, the known mist generator fails to adjustably control the oil mist dispersity when it is necessary to change the characteristics of the oil mist.

Also known is an oil mist generator of the vortex type (cf. U.S. Pat. No. 3,605,942, U.S. Cl. 184-626), which comprises an oil storage chamber, a vortex nozzle, and a screen member located in the path of movement of the rotating flow of oil mist. As in the case of the mist generator mentioned hereinabove, the nozzle comprises a combination of a chamber having tangential gas delivery channels adapted for creating a rotating flow of gas, an intermediate chamber supplying the oil into the rotating flow of gas, and an oil mist outlet. The intermediate chamber is provided with tangentially arranged inlets being in communication with the oil storage chamber and supplying the oil into the rotating flow of gas. The screen member is interposed in the path of movement of the gas rotating flow and is adjustable toward and away from the outlet of the nozzle.

In said generator, the nozzle functions in the same manner as in the generator described in the U.S. Pat. No. 3,515,676, U.S. Cl. 252-359. The oil mist, as it exits from the nozzle outlet, is formed by the oil particles which are variable in size. The large-sized particles impact against the screen member are broken down into small-sized particles, and then are directed to the machinery parts to be lubricated. The screen member is adjustable toward and away from the nozzle outlet to vary the size of oil particles. The size of the oil particles aerosolized in the gaseous carrier decreases as the screen member moves towards the nozzle outlet. Alternatively, when the screen member moves away from the nozzle outlet, the size of the particles increases. The screen member movable toward and away from the nozzle outlet effects the oil mist dispersity control.

However, when using the screen member, some large-sized oil particles settle thereon, thus forming an oil film interacting, in turn, with the rotating flow of oil mist moving past the screen. As a result, some of the small-sized particles are drawn into said oil film, which decreases the oil mist density.

The generated oil mist of decreased density requires an increased amount of pressurized gas for its transportation which leads to an excessive power consumption.

SUMMARY OF THE INVENTION

It is an object of the present invention to provide an oil mist generator creating a high density mist.

Another object of the present invention is to provide an oil mist generator creating an oil mist having a high degree of dispersity.

A further object of the present invention is to provide an oil mist generator creating such an oil mist which is useable to be transported for a large distance.

A more specific object of the present invention is to provide an oil mist generator creating an oil mist which is useable to be transported with a minimum expenditure of pressurized gas.

Still another object of the present invention is to provide an oil mist generator using gas under less pressure, thus reducing the power consumption required for generation of an oil mist.

With these and other objects in view, there is proposed a vortex-type oil mist generator comprising a nozzle provided with tangential gas delivery channels to create a rotating flow of gas and having an oil delivery duct supplying the oil into the rotating flow of gas, accompanied by the creation of a rotating flow of oil mist, and an oil mist outlet, which generator, according to the present invention, is further provided with a second nozzle which is identical in design with the first nozzle, the second nozzle being arranged so that its outlet discharging the rotating flow of oil mist faces the respective outlet of the first nozzle, tangential gas delivery channels of the second nozzle being arranged to provide the rotation of the oil mist flow exiting from the outlet of the second nozzle in the direction opposite to the direction of rotation of the oil mist flow exiting from the outlet of the first nozzle.

The advantage of the proposed invention resides in that owing to the second nozzle designed and arranged in accordance with the present invention, as well as due to the proposed mutual arrangement of the gas delivery channels of the first and second nozzles, large-sized particles of one of the rotating flows of oil mist impact against the oil particles contained in the other rotating flow of oil mist which is oppositely rotated, which results in more efficient particalization of the oil contained in the mist, thus providing the oil mist possessing an increased degree of dispersity as compared to the prior art mist generators.

Another advantage of the proposed mist generator resides in that the rotating flow of oil mist meets only the analogous flow of oil mist. This obviates, therefore, the formation of the oil film which has the tendency to take up oil particles thereinto, as a result a high density mist is provided as compared with the prior art mist generators.

Still another advantage of the proposed generator consists in that it provides such an oil mist which is directed to the points requiring lubrication with less consumption of both pressurized gas and energy as compared to the prior art generators.

It is advisable that the first and second nozzles be adjustable toward and away from the respective oil mist outlets.

Such an arrangement of the nozzles permits the rate of oil particle collision to be varied, which makes it possible to control the oil mist dispersity. As the distance between the respective nozzle outlets is decreased, the oil particle collision rate is increased with the result that the oil particles are decreased in size.

It is further advisable that the first and second nozzles be adjustably mounted to vary an angle between the axes thereof, thus widening the scope of controlling the oil mist dispersity for the purpose of defining the optimum size of the oil particles and the oil mist density for every kind of oil as well as for any type of lubricant systems.

BRIEF DESCRIPTION OF THE DRAWINGS

Other objects and advantages of the invention reside in various features of construction, combinations and arrangements of parts, as will hereinafter become more clear from the following detailed description of a preferred embodiment illustrated in the accompanying drawings, wherein.

DETAILED DESCRIPTION OF THE INVENTION

Figure 1:
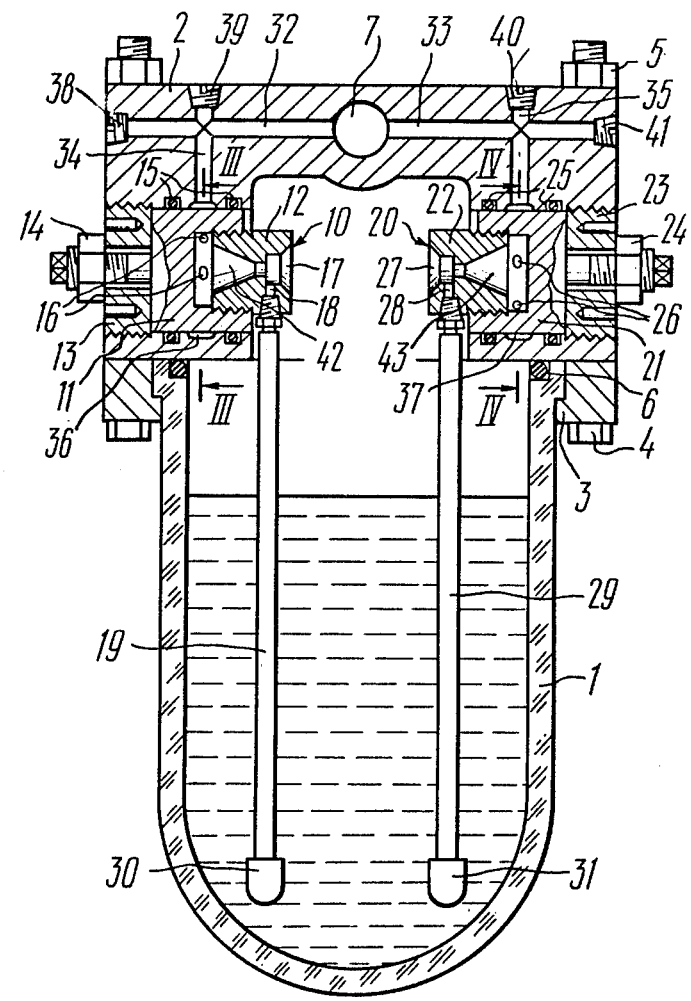
FIG. 1 is a sectional view, taken along line I—I of FIG. 2, of a vortex-type oil mist generator, in accordance with the present invention.
Figure 2:
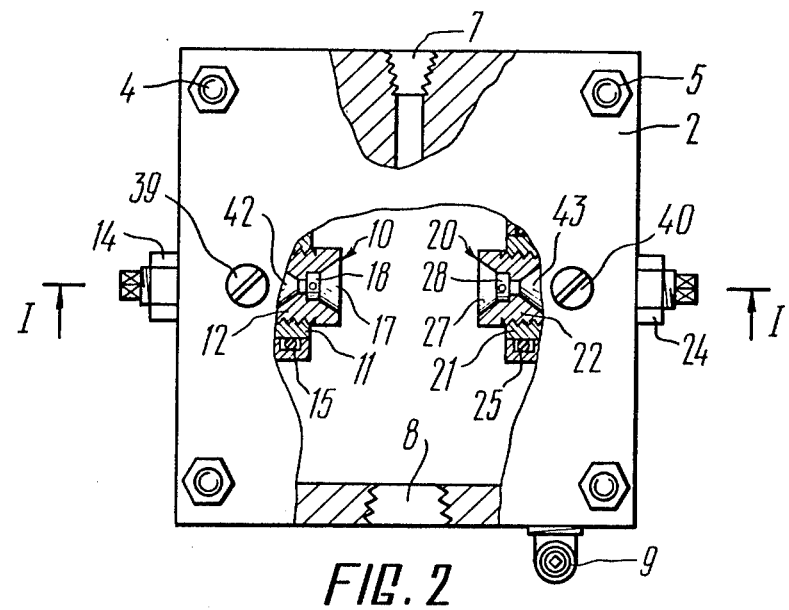
FIG. 2 is a plan view, partially in cross section, of a vortex-type oil mist generator, in accordance with the present invention.

Referring now to the drawings and initially to FIG. 1, the proposed vortex-type oil mist generator comprises an oil storage chamber 1 connected with a cover 2 by flanges 3, bolts 4 and nuts 5. The storage chamber 1 and the cover 2 are secured together in a sealing relationship by means of a sealing member 6 disposed therebetween. The cover 2 includes an inlet opening 7 to supply a pressurized gas into the oil mist generator. An outlet opening 8 (FIG. 2) serves to supply a generated oil mist to points requiring lubrication.

The oil is fed into the oil mist generator via a pipe connection 9. The cover 2 (FIGS. 1 and 2) is provided with a first nozzle 10 which is defined by a housing member 11 and a sprayer 12.

As indicated in FIG. 1, a plug 13 and a nut 14 are intended to lock the first nozzle 10 in the cover 2. Sealing members 15 prevent leakage of oil and pressurized gas through the gaps between the nozzle 10 and the cover 2. The nozzle 10 has tangential gas delivery channels 16 adapted to create a rotating flow of gas, an oil mist outlet 17 discharging a rotating flow of oil mist, and a passageway 18 which is in communication with the interior of the oil storage chamber 1 through a tube 19. The tube 19 in combination with the passageway 18 defines an oil delivery duct supplying the oil into the rotating flow of gas, generated within the nozzle 10.

The cover 2 (FIGS. 1 and 2) is further provided with a second nozzle 20 mounted therein and comprising a housing member 21 and a sprayer 22. A plug 23 (FIG. 1) and a nut 24 are used to lock the nozzle 20 in the cover 2. Sealing members 25 prevent leakage of oil and pressurized gas through the gaps between the nozzle 20 and the cover 2. The nozzle 20 which is similar in design to the nozzle 10, comprises tangential gas delivery channels 26 adapted to create a rotating flow of gas, an oil mist outlet 27, and a passageway 28 communicating via a tube 29 with the oil storage chamber 1. The tube 29 in combination with the passageway 28 defines an oil delivery duct supplying the oil into the mass of gas swirled within the nozzle 20.

The tubes 19 and 29 are provided with filters 30 secured to their ends to remove impurities from the oil drawn into the nozzles 10 and 20.

Channels 32 and 33 are provided in the cover 2, adapted to be in communication with the inlet opening 7 and disposed normally to channels 34 and 35 communicating with annular cavities 36 and 37 formed in the cover 2. The inlet openings of the channels 32, 34, 35 and 33 are plugged by respective screw stoppers 38, 39, 40, 41.

Figures 3, 4:
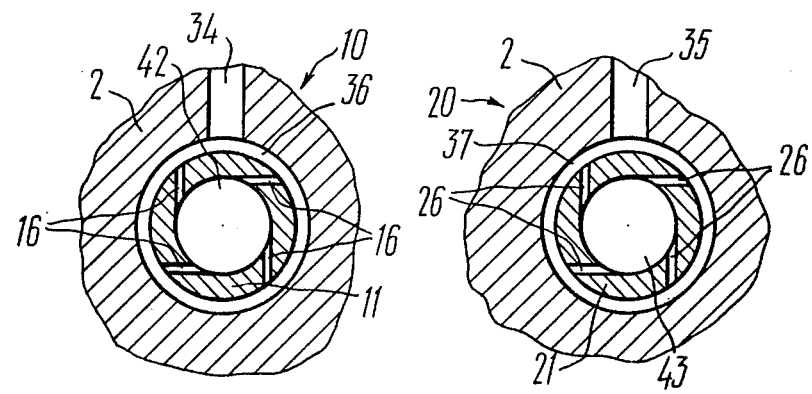
FIG. 3 is a sectional view taken along line III—III of FIG. 1.
FIG. 4 is a sectional view taken along line IV—IV of FIG. 1.

As shown in FIG. 3, the gas delivery channels 16 are tangentially arranged, extend in the same direction with respect to the axis of the nozzle 10, and are in communication with a chamber 42. Owing to the tangential arrangement of the channels 16, the gas is caused to be swirled within the chamber 42. As a result, the gas, as it leaves the chamber 42, is rotating at a high velocity, which provides a maximum suction within the passageway 18 (FIG. 1) adapted for supplying the oil into the rotating flow of gas, which, in turn, results in a more efficient particalization of the oil.

The gas delivery channels 26 (FIG. 4) of the nozzle 20, which are similar in design to the channels 16 of the nozzle 10, are used to direct the pressurized gas from the annular cavity 37 into a chamber 43.

It should be noted that the tangential gas delivery channels 16 (FIG. 3) of the first nozzle 10 and the similar channels 26 (FIG. 4) of the second nozzle 20 are arranged so as to cause two rotating flows of oil mist to be oppositely swirled. The oil mist outlet 27 (FIG. 2) of the second nozzle 20 is arranged to face the respective outlet 17 of the first nozzle 10.

Figure 5:
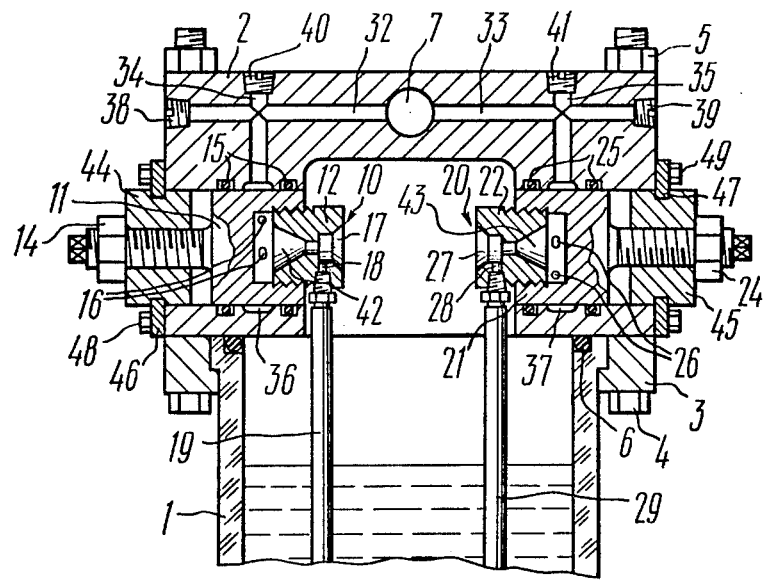
FIG. 5 is a sectional view of the upper part of an oil mist generator, illustrating one embodiment of the invention.

In one embodiment as shown in FIG. 5, the nozzles 10 and 20 are adjustably mounted to vary a distance between their respective outlets 17 and 27. This is achieved by means of nuts 44 and 45 which are prevented from axial displacement with respect to the cover 2 by C-rings 46 and 47 secured to the cover 2 with bolts 48 and 49.

Figure 6:
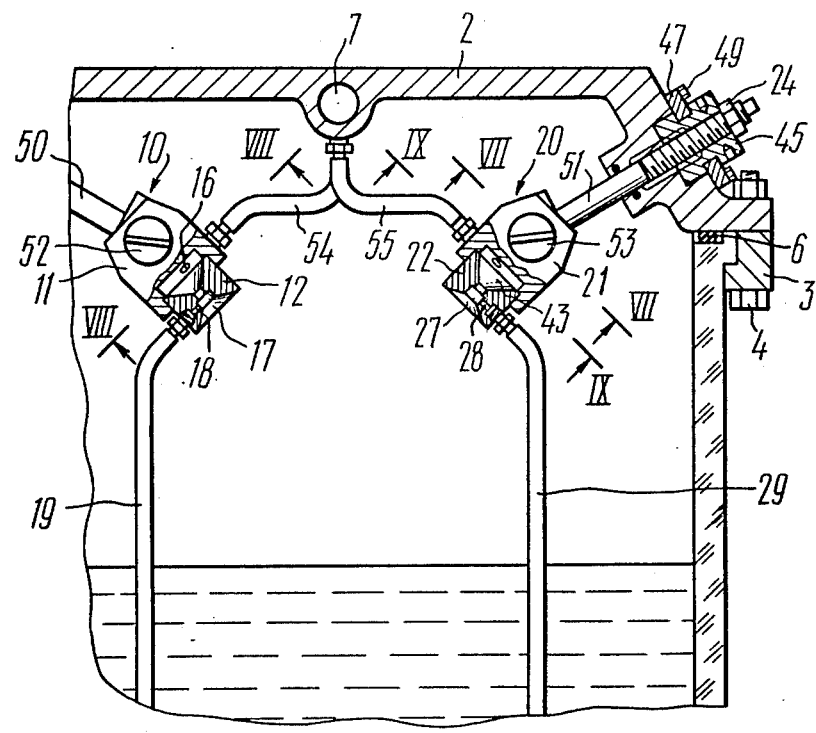
FIG. 6 is a sectional view of the upper part of an oil mist generator, illustrating another embodiment of the invention.
Figure 7:
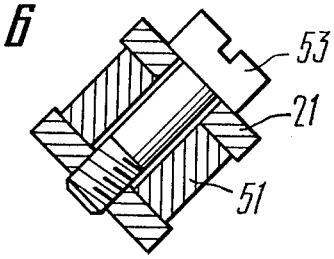
FIG. 7 is a sectional view taken along line VII—VII of FIG. 6.

In another embodiment, shown in FIG. 6, the nozzles 10 and 20 are adjustably mounted to vary both the distance between their outlets 17 and 27 and the angle between the axes of the nozzles. It should be noted that the nozzles 10 and 20 can be adjustably mounted to vary only an angle between their axes. This is achieved by that the nozzles 10 and 20 are pivotally mounted on slides 50 and 51 and are locked at any requisite angle by means of screws 52 and 53 (FIG. 7).

Figures 8, 9:
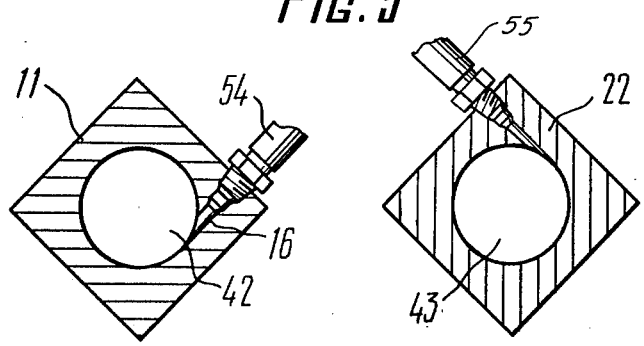
FIG. 8 is a sectional view taken along line VIII—VIII of FIG. 6.
FIG. 9 is a sectional view taken along line IX—IX of FIG. 6.

The pressurized gas is directed into the nozzles 10 and 20 (FIG. 6) through flexible pipes 54 (FIGS. 6 and 8) and 55 (FIGS. 6 and 9) which are in communication with the inlet opening 7 (FIG. 6).

In operation, the pressurized gas is caused to flow through the inlet opening 7 (FIG. 1), and through the channels 32, 33, 34 and 35 into the annular cavities 36 and 37, and further through the tangential gas delivery channels 16 and 26 into the chambers 42 and 43, respectively. The rotating flows of gas, as they exit from the respective chambers 42 and 43, each creates a suction area. The suction areas cause the oil to be aspirated from the oil storage chamber 1 and through the tubes 19 and 29 and the passageways 18 and 28 into the respective rotating flows of gas where the oil is sheared to form finely devided particles, thus creating two rotating flows of oil mist exiting from the outlets 17 and 27, respectively.

The tangential gas delivery channels 26 (FIG. 4) of the second nozzle 20 and the similar channels 16 (FIG. 3) of the first nozzle 10 are mutually arranged so as to provide the rotation of the oil mist flow exiting from the outlet 17 (FIG. 1) in the direction opposite to the direction of rotation of the oil mist flow exiting from the outlet 27 of the nozzle 20. Since the outlets 17 and 27 are arranged to face each other, the axial velocities of the oil mist flows are oppositely directed. When the oppositely directed flows of oil mist come into contact with each other, the many times repeated collisions of oil particles take place, resulting in oil efficient shearing, which gives rise to an increased dispersity of the generated oil mist. Moreover, the mist dispersity tends to increase due to the fact that the relative velocity of each of two oil particles colliding one against the other, is equal to the total velocity of two particles relative to the fixed coordinate system.

In the embodiment shown in FIG. 5, the nozzles 10 and 20 are movably mounted to vary the distance between the outlets 17 and 27. This is achieved by rotating the nuts 44 and 45 fixed in the axial direction by means of C-rings 46 and 47. As the distance between the outlets 17 and 27 decreases, oil particles tend to impact one against another in a more efficient manner, thus increasing the oil mist dispersity.

According to the embodiment shown in FIG. 6, the flexible pipes 54 and 55 are used to direct the pressurized gas into the gas delivery channels 16 and 26 of the respective nozzles 10 and 20.

The rotating flows of oil mist exiting from the outlets 17 and 27 are oppositely swirled, this contributing, as mentioned hereinbefore, to high dispersity mist generation.

The screws 52 and 53 being loosened, the angle between the axes of the nozzles 10 and 20 can be varied by simple rotating of said nozzles about the axes of the screws 52 and 53. The variations of the angle between the nozzle axes makes it possible to widen the range of oil mist dispersity controlling and thus to achieve the optimum conditions required for generation the oil mist possessing a high degree of dispersity.

It should be noted that the proposed vortex-type oil mist generator prevents the occurrence of oil film in operation, which enables a high density mist to be generated thus resulting in a decreased amount of gas suitable to direct appropriate amounts of oil to points requiring lubrication.

Moreover, the generated oil mist possesses an increased degree of dispersity, which makes it possible to direct the mist to machinery parts far removed from the generator with minimum possibility of choking the pipe line.

Among other things, two oppositely directed flows of oil mist give rise to a more efficient particalization of oil particles, therefore, there is no need to generate a high dispersity mist at the outlet of each of the nozzles. Taken together, all these features make it possible to use gas under less pressure and hence to reduce the power consumption.

Although the present invention is herein disclosed with reference to the oil used as a liquid to be aerosolized, it will be apparent to those skilled in the art that any other liquid may be aerosolized without departure from the essence of the invention.

What is claimed is:

1. A vortex-type oil mist generator comprising a first nozzle having tangential gas delivery channels to generate a rotating flow of gas, an oil delivery duct supplying the oil into the rotating flow of gas to create a rotating flow of oil mist, and an oil mist outlet; a second nozzle having tangential gas delivery channels to generate a rotating flow of gas, an oil delivery duct supplying the oil into the rotating flow of gas to create a rotating flow of oil mist, and an oil mist outlet; said outlet of said second nozzle facing said outlet of said first nozzle; said tangential gas delivery channels of said second nozzle being arranged so as to ensure the rotation of the oil mist flow exiting from said second nozzle outlet in the direction opposite to the direction of rotation of the oil mist flow exiting from said outlet of said first nozzle.

2. A vortex-type oil mist generator according to claim 1, wherein said first and second nozzles are adjustably mounted to decrease the distance between said oil mist outlets thereof when increase in oil mist dispersity is required or to increase the distance therebetween when decrease in oil mist dispersity is required.

3. A vortex-type oil mist generator according to claim 1, wherein said first and said second nozzles are adjustably mounted to increase an angle between the axes thereof when increase in oil mist dispersity is required, or to reduce an angle between the axes thereof to reduce oil mist dispersity.

* * * * *